(12) United States Patent
You

(10) Patent No.: US 6,446,881 B1
(45) Date of Patent: Sep. 10, 2002

(54) PORTABLE SPRAY CAR WASH DEVICE

(76) Inventor: Jung You, 1210 Waterville Ct., Alpharetta, GA (US) 30022

( * ) Notice: Subject to any disclaimer, the term of this patent is extended or adjusted under 35 U.S.C. 154(b) by 0 days.

(21) Appl. No.: 09/775,031

(22) Filed: Feb. 1, 2001

(51) Int. Cl.[7] .................................................. B05B 9/03
(52) U.S. Cl. ...................................... 239/146; 239/305
(58) Field of Search ................................ 239/146, 176, 239/302–305; 222/609, 626

(56) References Cited

U.S. PATENT DOCUMENTS

| 3,680,786 A | 8/1972 | Levy |
| 3,797,744 A | 3/1974 | Smith |
| 3,831,849 A | 8/1974 | Studinger |
| 4,059,123 A | 11/1977 | Bartos et al. |
| 4,089,446 A | 5/1978 | Logan, II et al. |
| 4,546,903 A | 10/1985 | Burch |
| 4,821,958 A | 4/1989 | Shaffer |
| 4,967,960 A | 11/1990 | Futrell |
| 5,029,758 A | 7/1991 | Chayer |
| 5,064,123 A | 11/1991 | Aiello et al. |
| 5,387,200 A | 2/1995 | Kronstadt |
| 5,421,900 A | 6/1995 | Clontz |
| 5,816,499 A | * 10/1998 | Christiansen .......... 137/355.12 |

FOREIGN PATENT DOCUMENTS

GB 2074048 * 10/1981

* cited by examiner

Primary Examiner—Lesley D. Morris
(74) Attorney, Agent, or Firm—Barry E. Kaplan, Esq.; Hughes & Kaplan

(57) ABSTRACT

A portable, battery powered spray applicator car wash device capable of holding and dispensing liquid cleansers and waxes for rubbing into the body and windows of a vehicle, thereby enabling complete and portable mobile washing and cleaning services and complete detailing of a vehicle without the use of water.

19 Claims, 8 Drawing Sheets

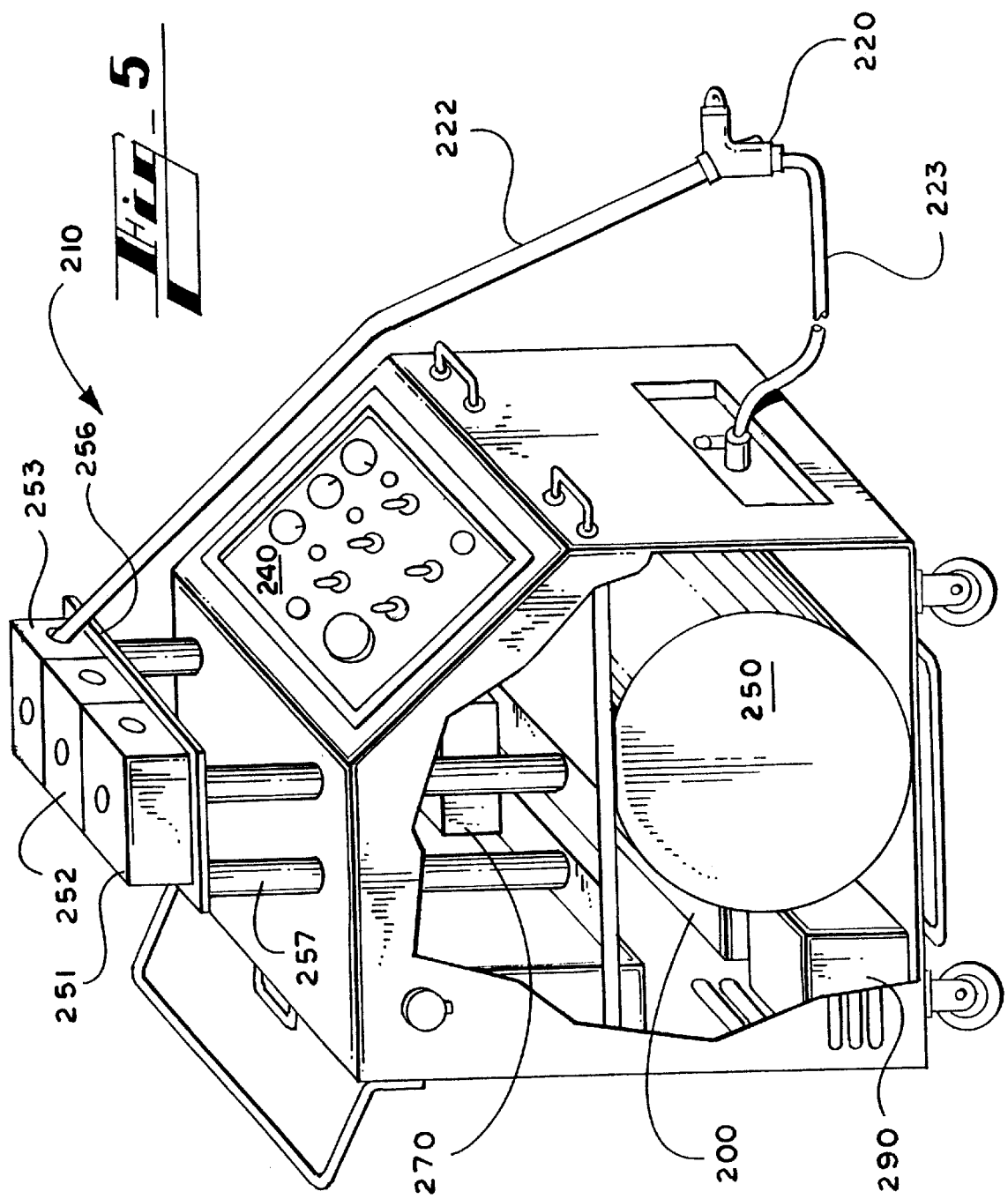
Fig_5

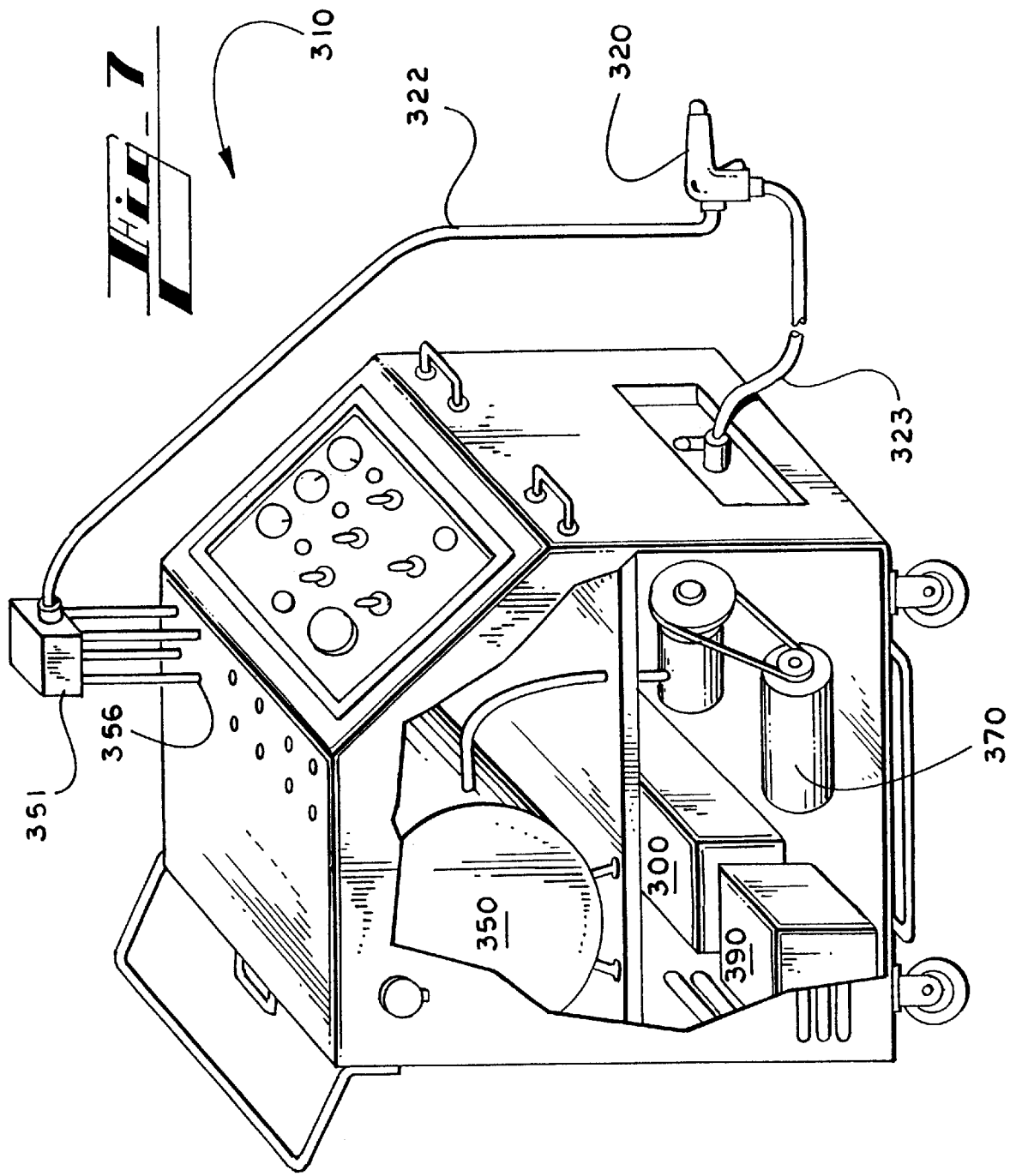

PORTABLE SPRAY CAR WASH DEVICE

TECHNICAL FIELD

The present invention relates generally to portable spray devices and, more specifically, to a portable spray car wash device capable of holding and dispensing liquid cleansers and waxes for rubbing into the body and windows of a vehicle, thereby enabling complete washing and cleaning thereof. The present invention is particularly useful in, although not strictly limited to, automobile detailing applications desiring portability of equipment and materials for mobile washing and cleaning services.

BACKGROUND OF THE INVENTION

The purchase of an automobile represents a considerable expense. For most individuals, even the expense of an economy car can be substantial. However, despite rising sticker prices and increases in fuel costs, luxury and sports automobiles continue to be sought after. Thus, the prestige of driving an attractive car endures.

Some car and truck owners enjoy individualizing their vehicles by purchasing specialty paint jobs, stylish wheels, chrome accessories and ornamental lighting packages. Others prefer to maintain their car, truck, sport utility vehicle (SUV) or van as close to factory issue as possible. Many rely on routine cleaning and maintenance to maximize their enjoyment, as well as the life of their car.

Cleaning and detailing a vehicle instantly improves its appearance. Owners maintain a sense of "new car" appreciation with a clean interior. A shining exterior, on the other hand, conveys a sense of pride to all who see it. Whether luxury or economy, a car with a freshly cleaned and waxed body and spotless windows is to be admired.

Unfortunately, cleaning and detailing a car, truck, SUV or van is a time-consuming and labor-intensive endeavor. Automatic car wash facilities have become increasingly available, with many directly associated with fueling stations. These automated facilities do provide convenience, however are unable to offer detailed cleaning. Hand wash and detail centers offer detailing and hand cleaning, however sacrifice some of the convenience. Since hand cleaning necessarily requires more time than an automatic car wash, the vehicle owner must either make an appointment to leave his or her car, or must wait while the job is completed.

One recently introduced alternative wherein the benefits of hand cleaning and detailing are combined with total convenience is mobile detailing service. Such a service travels to the vehicle, either at home or place of business, and completely cleans and details the car while it is parked and otherwise unneeded. These mobile detailing service professionals utilize a variety of cleaning tools, solutions and products and must transport them to each location.

Devices have been introduced to enable various mobile cleaning applications. One type of mobile cleaning apparatus, such as described in U.S. Pat. Nos. 3,680,786 to Levy and 4,967,960 to Futrell, connects to a water source thereby enabling the selective spray application of a cleaning solution entrained in water or water for rinsing. The disadvantageous reliance of this type of device on an external water source limits its true mobile usability. Other devices, such as described in U.S. Pat. No. 3,797,744 to Smith and U.S. Pat. No. 5,064,123 to Aiello, et al., further limit their portability by depending upon external power and air supplies, often in addition to a water source. Such limitations inhibit truly moveable use.

Alternative types of mobile cleaning apparatus' are described in U.S. Pat. Nos. 5,029,758 to Chayer, 4,089,446 to Logan, 3,831,849 to Studinger and 4,546,903 to Burch. These devices still depend upon water, however, provide an on-board water supply tank, thus eliminating the need to connect to an external water source. Some also have the ability to rely on battery power to enable free movement. However, the tank size, in addition to the considerable weight of multiple gallons of water, disadvantageously inhibits true portability and maneuverability.

Therefore, it is readily apparent that there is a need for a portable spray car wash device enabling complete detailing of a vehicle without the use of water, wherein cleansers and waxes for rubbing into the body and windows of a vehicle are held and dispensed thereby, thus preventing the above-discussed disadvantages.

BRIEF SUMMARY OF THE INVENTION

Briefly described, in a preferred embodiment, the present invention overcomes the above-mentioned disadvantages, and meets the recognized need for. such a device, by providing a portable spray car wash device capable of holding and dispensing liquid cleansers and waxes for rubbing into the body and windows of a vehicle, thereby enabling portability of equipment and materials for mobile washing and cleaning services.

According to its major aspects and broadly stated, the present invention is a portable, battery powered spray applicator device enabling complete detailing of a vehicle without the use of water, wherein a variety of liquid cleansers and waxes for rubbing into the body and windows of a vehicle are held and dispensed thereby.

More specifically, the present invention is a portable cart housing equipment and materials for washing and cleaning vehicles. The wheeled cart has a base platform supporting three reservoir containers, at least one motor, a battery and a battery charger. A housing surrounds the platform, protectively covering the equipment held therewithin.

An AC power receptacle is located within the housing, wherein a power cord is attached thereto for operating the battery charger. An external control panel is also provided within the housing. The panel includes switches and controls that are appropriately linked to the battery, battery charger and sprayers, whereby each may be turned on or off, and whereby flow of the chemical solutions may be controlled. The panel also includes an emergency stop override switch whereby power flow can be immediately interrupted. Ventilation panels are defined through the housing to provide necessary airflow to and from the enclosed equipment. Several handles are attached to the exterior of the housing, whereby the device is easily pushed, pulled, and lifted. A toolbox is mounted within the housing, wherein access thereto is provided by an exterior door flush with the housing.

The three reservoir containers are accessible above the upper surface of the housing, wherein each container has a user-accessible threaded cap mounted thereon. Each cap may have a handle, whereby the user can loosen or tighten the cap as necessary for removal or replacement thereof. Each of the three containers is linked to a motor, thereby enabling controlled spraying of selected container contents through a hose and spray trigger. A first container holds a chemical solution for spraying onto the metal and/or fiberglass shell of an automobile, for rubbing into the shell and removing dirt, grime and grease therefrom. A second container holds a glass cleaning solution for spraying onto the windshield and windows of an automobile, for rubbing off and cleansing the windshield and windows. A third container holds a liquid wax for spraying onto the metal and/or fiberglass shell of an automobile, for rubbing into the metal and/or fiberglass for a polished shine.

Accordingly, a feature and advantage of the present invention is the ability of such a device to provide a portable spray car wash device that enables complete detailing of a vehicle without the use of water.

A feature and advantage of the present invention is the ability of such a device to hold and dispense cleansers and waxes for rubbing into the body and windows of a vehicle.

A feature and advantage of the present invention is the ability of such a device to provide. a portable cart having equipment and materials for washing and cleaning vehicles.

A feature and advantage of the present invention is the ability of such a device to provide a battery-operated, rechargeable portable spray car wash unit.

A feature and advantage of the present invention is the ability of such a device to provide user-actuated flow control for spray dispensing of cleansers and waxes for rubbing into the body and windows of a vehicle.

A feature and advantage of the present invention is the ability of such a device to provide a portable cart for washing and cleaning vehicles, wherein several handles are provided for ease of mobility.

A feature and advantage of the present invention is the ability of such a device to provide a portable cart for washing and cleaning vehicles, wherein several hooks are provided for carrying hanging supplies.

A feature and advantage of the present invention is the ability of such a device to provide an on-board toolbox for portable access to tools.

A feature and-advantage of the present invention is the ability of such a device to provide three reservoir containers, each having an independent spray trigger, whereby cross-contamination of container contents is prevented.

A feature and advantage of the present invention is the ability of such a device to provide a reservoir container for holding a chemical solution for spraying onto the metal and/or fiberglass shell of an automobile, for rubbing into the shell and removing dirt, grime and grease therefrom.

A feature and advantage of the present invention is the ability of such a device to provide a reservoir container for holding a glass cleaning solution for spraying onto the windshield and windows of an automobile, for rubbing off and cleansing the windshield and windows.

A feature and advantage of the present invention is the ability of such a device to provide a reservoir container for holding a liquid wax for spraying onto the metal and/or fiberglass shell of an automobile, for rubbing into the metal and/or fiberglass for a polished shine.

These and other objects, features and advantages of the invention will become more apparent to one skilled in the art from the following description and claims when read in light of the accompanying drawings.

BRIEF DESCRIPTION OF THE DRAWINGS

The present invention will be better understood by reading the Detailed Description of the Preferred and Alternate Embodiments with reference to the accompanying drawing figures, in which like reference numerals denote similar structure and refer to like elements throughout, and in which:

FIG. 5 is a perspective cutaway view of portable spray car wash device according to a first alternate embodiment of the present invention;

FIG. 6 is a side cutaway view of the portable spray car wash device of FIG. 5;

FIG. 7 is a perspective cutaway view of portable spray car wash device according to a second alternate embodiment of the present invention;

FIG. 9 is a side cutaway view of the portable spray car wash device of FIG. 8; and, FIG. 10 is a representative schematic diagram of the control panel of FIGS. 5 through 9.

DETAILED DESCRIPTION OF THE PREFERRED AND ALTERNATE EMBODIMENTS

In describing the preferred and alternate embodiments of the present invention, as illustrated in the figures, specific terminology is employed for the sake of clarity. The invention, however, is not intended to be limited to the specific terminology so selected., and it is to be understood that each specific element includes all technical equivalents that operate in a similar manner to accomplish similar functions.

Figure 1:
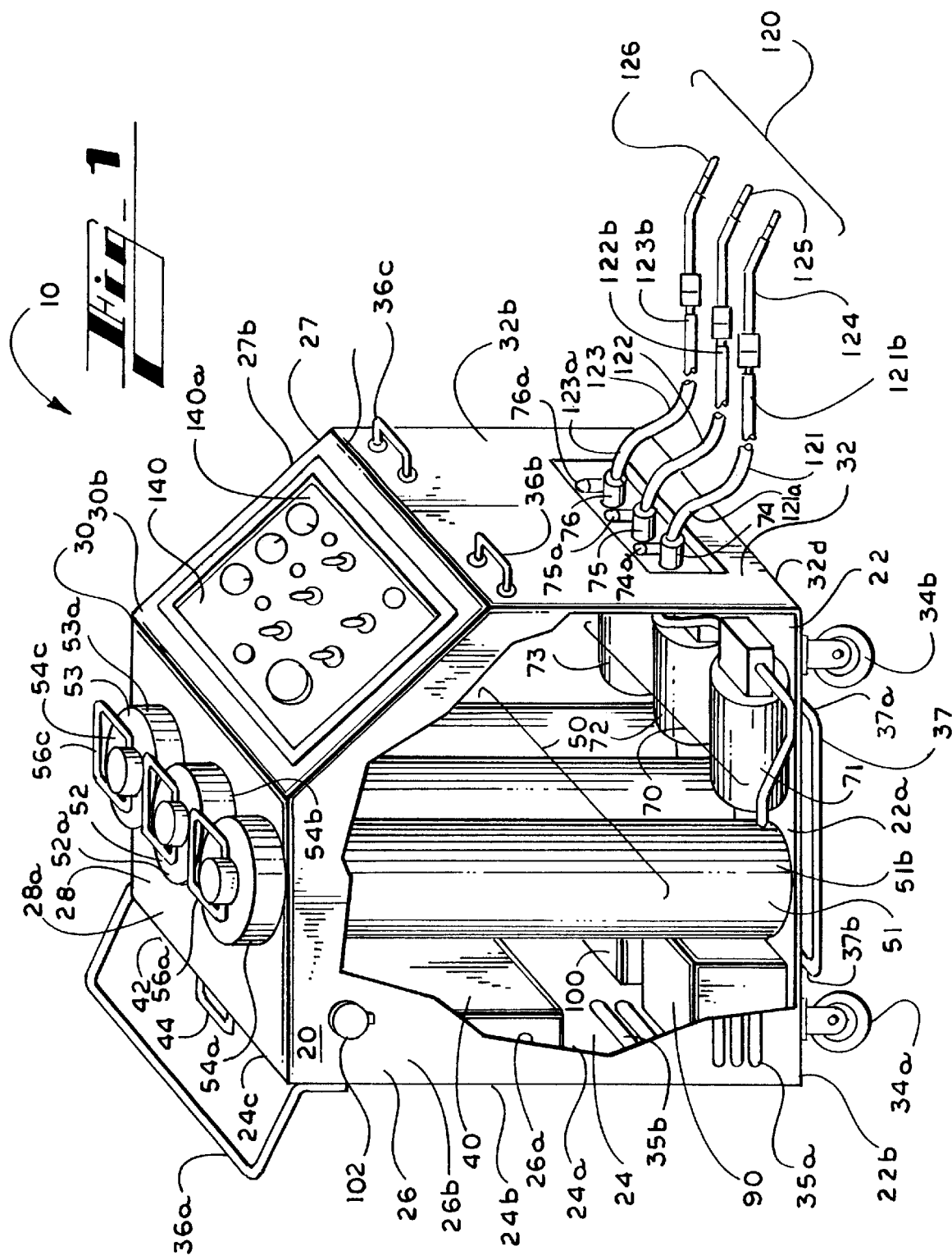
FIG. 1 is a perspective cutaway view of portable spray car wash device according to a preferred embodiment of the present invention.
Figure 2:
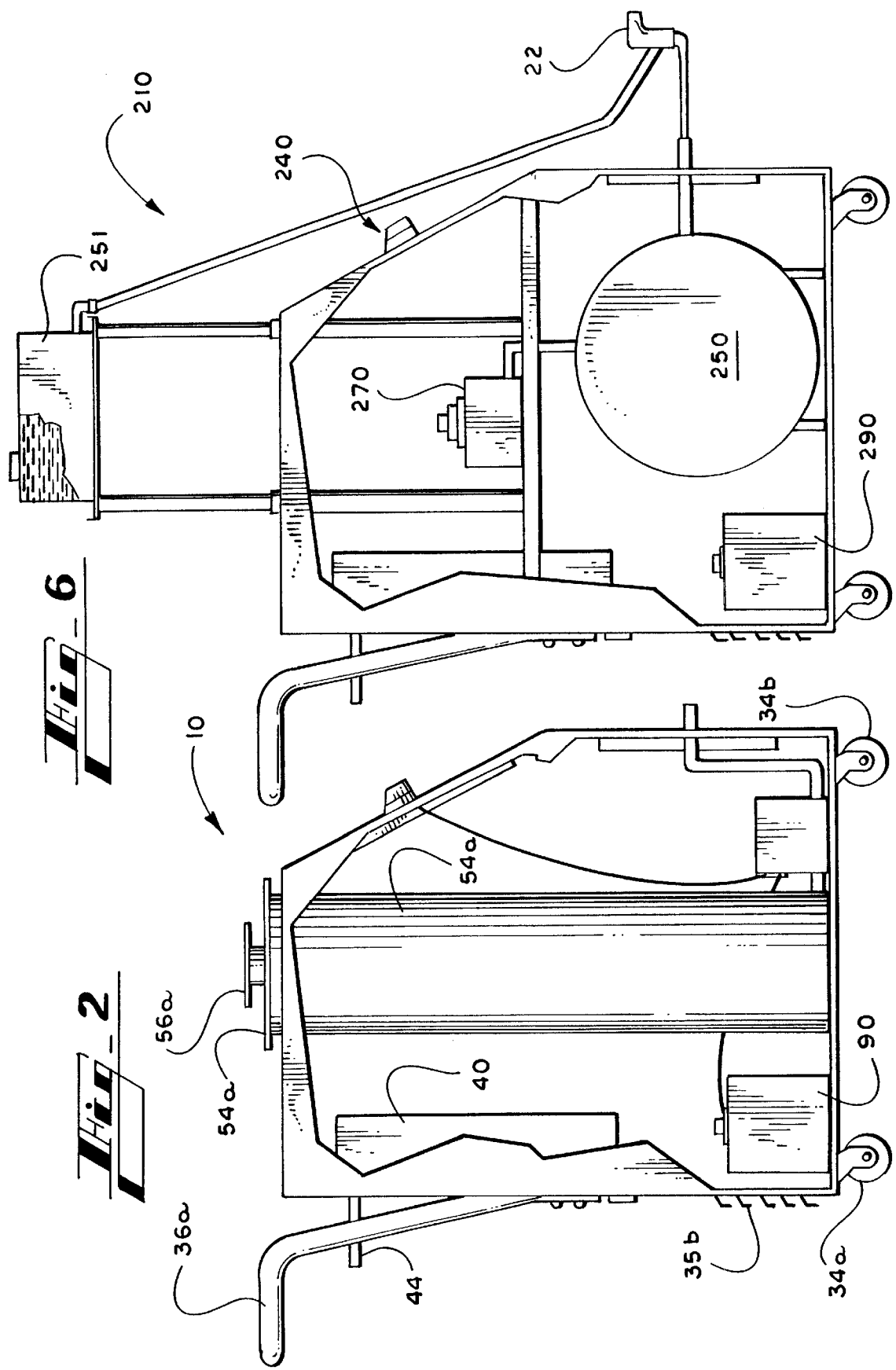
FIG. 2 is a side cutaway view of the portable spray car wash device of FIG. 1.

Referring now to FIG. 1 and FIG. 2, the present invention is a portable spray car wash device 10 comprising portable cart housing 20, reservoir containers 50, motors 70, battery 90, battery charger 100, spray applicators 120 and control panel 140.

Preferably, portable cart housing 20 is defined by substantially horizontal base wall 22, substantially vertical rear wall 24, substantially vertical first side wall 26 and second side wall 27, substantially horizontal top wall 28, angled first front wall 30 and substantially vertical second front wall 32. Base wall 22 and top wall 28 have upper surfaces 22a and 28a, respectively, and lower surface 22b and 28b, respectively. Rear wall 24, first side wall 26, second side wall 27, first front wall 30 and second front wall 32 have inner surfaces 24a, 26a, 27a, 30a and 32a, respectively, and outer surfaces 24b, 26b, 27b, 30b and 32b, respectively.

Portable cart housing 20 preferably has four wheels, 34a, 34b, 34c and 34d, wherein wheels 34a, 34b, 34c and 34d are pivotally secured to lower surface 22b of base wall 22.

Preferably, ventilation panels 35a, 35b and 35c are defined through first side wall 26, rear wall 24 and second side wall 27, respectively, of portable cart housing 20 to provide airflow to and from equipment enclosed therewithin.

Preferably, handles 36a, 36b, 36c, 37 and 38 (not shown) are secured to portable cart housing 20. Preferably, handle 36a is positioned substantially horizontally on outer surface 24b of rear wall 24 and secured thereto proximate to upper edge 24c, extending from first side wall 26 to second side wall 27 to provide for user hand-controlled positioning of portable spray car wash device 10. Preferably, handles 36b and 36c are positioned substantially horizontally on outer surface 32b of second front wall 32 and secured thereto proximate to upper edge 32c, proximate to first side wall 26 and second side wall 27, respectively, to provide for user hand-controlled positioning of portable spray car wash device 10. Handles 37 and 38 have first ends 37a and 38a, respectively, and second ends 37b and 38b, respectively. Preferably, first ends 37a and 38a of handles 37 and 38, respectively, are secured to outer surface 32b of second front wall 32, proximate to lower edge 32d. Preferably, second ends 37b and 38b of handles 37 and 38, respectively, are secured to outer surface 24b of rear wall 24, proximate to lower edge 24d. Preferably, handles 37 and 38 extend from second front wall 32 to rear wall 24, passing substantially horizontally proximate to outer surfaces 26b and 27b, respectively, of first side wall 26 and second side wall 27, respectively, to provide for holding and lifting of device 10 into and from a transporting vehicle.

Toolbox 40 is preferably mounted within portable cart housing 20, wherein access to inner compartment 41 thereof is preferably provided by hingedly secured exterior door 42. Preferably, door 42 of toolbox 40 is positioned substantially flush within rear wall 24 of portable cart housing 20. Handle 44 of door 42 is secured thereto, preferably positioned substantially horizontally proximate to top edge 24c of rear wall 24 of portable cart housing 20.

Preferably, reservoir containers 50 are substantially cylindrically shaped. First reservoir container 51, second reservoir container 52 and third reservoir container 53 have first ends 51a, 52a and 53a and second ends 51b, 52b and 53b, respectively. Preferably, second ends 51b, 52b and 53b of reservoir containers 51, 52 and 53, respectively, are positioned on upper surface 22a of base wall 22 of portable cart housing 20. Preferably, first ends 51a, 52a and 53a of reservoir containers 51, 52 and 53, respectively, extend through top wall 28 enabling user access thereto.

Each reservoir container 51, 52 and 53 preferably has removable cap 54a, 54b and 54c, respectively, threadedly provided thereon. Each cap 54a, 54b and 54c preferably has handle 56a, 56b and 56c, respectively, provided thereon, whereby a user can loosen or tighten caps 54a, 54b and 54c as necessary for removal or replacement thereof, such as when filling of reservoir containers 51, 52 and 53 is desired.

Preferably, first reservoir container 51 is manufactured to enable storage of a user-selected chemical solution for spraying onto a metal or fiberglass shell of an automobile, wherein rubbing of the solution into the automobile shell removes dirt, grime and grease therefrom. Preferably, second reservoir container 52 is manufactured to enable storage of a user-selected glass cleaning solution for spraying onto a windshield and windows of an automobile, wherein rubbing cleanses the windshield and windows. Preferably, third reservoir container 53 is manufactured to enable storage of a user-selected liquid wax for spraying onto a metal or fiberglass shell of an automobile, wherein rubbing polishes and shines the metal or fiberglass.

Reservoir containers 50 are linked to motors 70. Preferably, reservoir container 51 is linked to motor 71, reservoir container 52 is linked to motor 72 and reservoir container 53 is linked to motor 73. Each motor 71, 72 and 73 directs a pressurized flow of liquid contents from reservoir containers 51, 52 and 53, respectively, into outlets 74, 75 and 76, respectively. Preferably, motors 70 are positioned on upper surface 22a of base wall 22 of portable cart housing 20, proximate to second front wall 32. Gauges 74a, 75a and 76a are preferably provided for outlets 74, 75 and 76, respectively, whereby a user can selectively view the levels of liquid in the respective reservoir container associated therewith.

Preferably, battery 90 is positioned on upper surface 22a of base wall 22 of portable cart housing 20, proximate to rear wall 24. Battery 90 is preferably 12 volt, 60 Amp, and is linked to motors 70, whereby power is supplied for operation thereof. Preferably, battery charger 100 is 6 Amp and is positioned on upper surface 22a of base wall 22 of portable cart housing 20, proximate to rear wall 24. Preferably, battery charger 100 is linked to battery 90, whereby recharging of battery 90 is enabled. Battery charger 100 is powered by common household AC current, and is linked to AC power receptacle 102 whereby power is supplied. Preferably, AC power receptacle 102 is positioned on first side wall 26 of portable cart housing 20, whereby a user-supplied power cord is inserted therein to supply power to battery charger 100.

Spray applicators 120 are preferably provided, wherein first end 121a, 122a and 123a of hoses 121, 122, and 123 are removably connected to outlets 74, 75 and 76, respectively, to receive a pressurized flow of liquid contents therefrom. Preferably, spray triggers 124, 125 and 126 are removably connected to second end 121b, 122b and 123b of hoses 121, 122 and 123, respectively.

Figure 3:
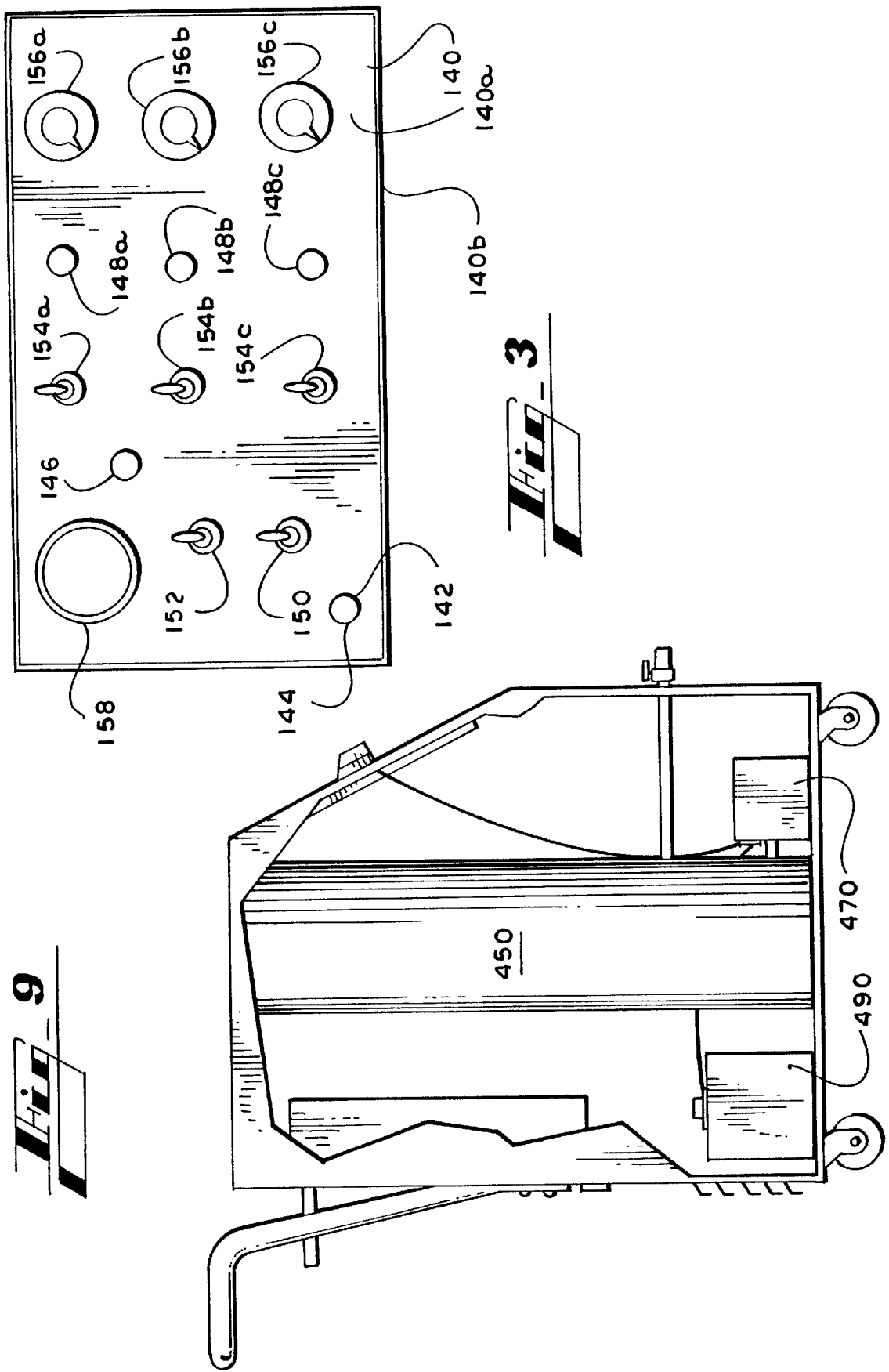
FIG. 3 is a front view of a control panel of the portable spray car wash device of FIG. 1.

Control panel 140 has an outer surface 140a, an inner surface 140b and is preferably positioned on outer surface 30b of second front panel 30 of portable cart housing 20. As best seen in FIG. 3, control panel 140 enables user control of provided features of portable spray car wash device 10. Fuse 142 is provided within control panel 140. Preferably, fuse 142 is 2 amp, 125 volt, and is easily accessible from outer surface 30b of second front panel 30 of portable cart housing 20. Preferably, fuse indicator light 144 is positioned on outer surface 140a of control panel 140, whereby fuse status can be readily ascertained by a user.

Preferably, power indicator light 146 is positioned on outer surface 140a of control panel 140, whereby power status of portable spray car wash device 10 can be readily ascertained by a user. Preferably, pump indicator lights 148a, 148b and 148c are positioned on outer surface 140a of control panel 140, whereby operational status of motors 71, 72 and 73, respectively, can be readily ascertained by a user.

Battery control switch 150 is preferably positioned on outer surface 140a of control panel 140, whereby a user can selectively enable or disable the flow of power from battery 90 to motors 70. Power indicator light 146 is illuminated upon successful activation of battery control switch 150. Wherein battery control switch 150 is activated, but no flow of power from battery 90 to motors 70 results, power indicator light 146 remains unlit, thereby notifying a user that battery 90 needs to be recharged.

AC/charge control switch 152 is preferably positioned on outer surface 140a of control panel 140, whereby a user can selectively enable or disable the flow of AC power from AC power receptacle 102 to battery charger 100, thereby enabling or disabling recharging of battery 90.

Pump control switches 154a, 154b and 154c are preferably positioned on outer surface 140a of control panel 140, whereby a user can selectively enable or disable the operation of motors 71, 72 and 73, respectively. Pump indicator lights 148a, 148b and 148c are preferably independently illuminated upon successful activation of pump control switches 154a, 154b and 154c, respectively.

Speed control knobs 156a, 156b and 156c are preferably positioned on outer surface 140a of control panel 140, whereby a user can selectively adjust the flow of chemical solution via respective motors 71, 72 and 73 to spray triggers 124, 125 and 126, thereby controlling the flowrate and volume of liquid spray being dispensed thereby.

Preferably, emergency stop switch 158 is positioned on positioned on outer surface 140a of control panel 140, whereby a user can selectively override all activated switches, immediately interrupting the flow of power and ceasing operation of portable spray car wash device 10.

Figure 4:
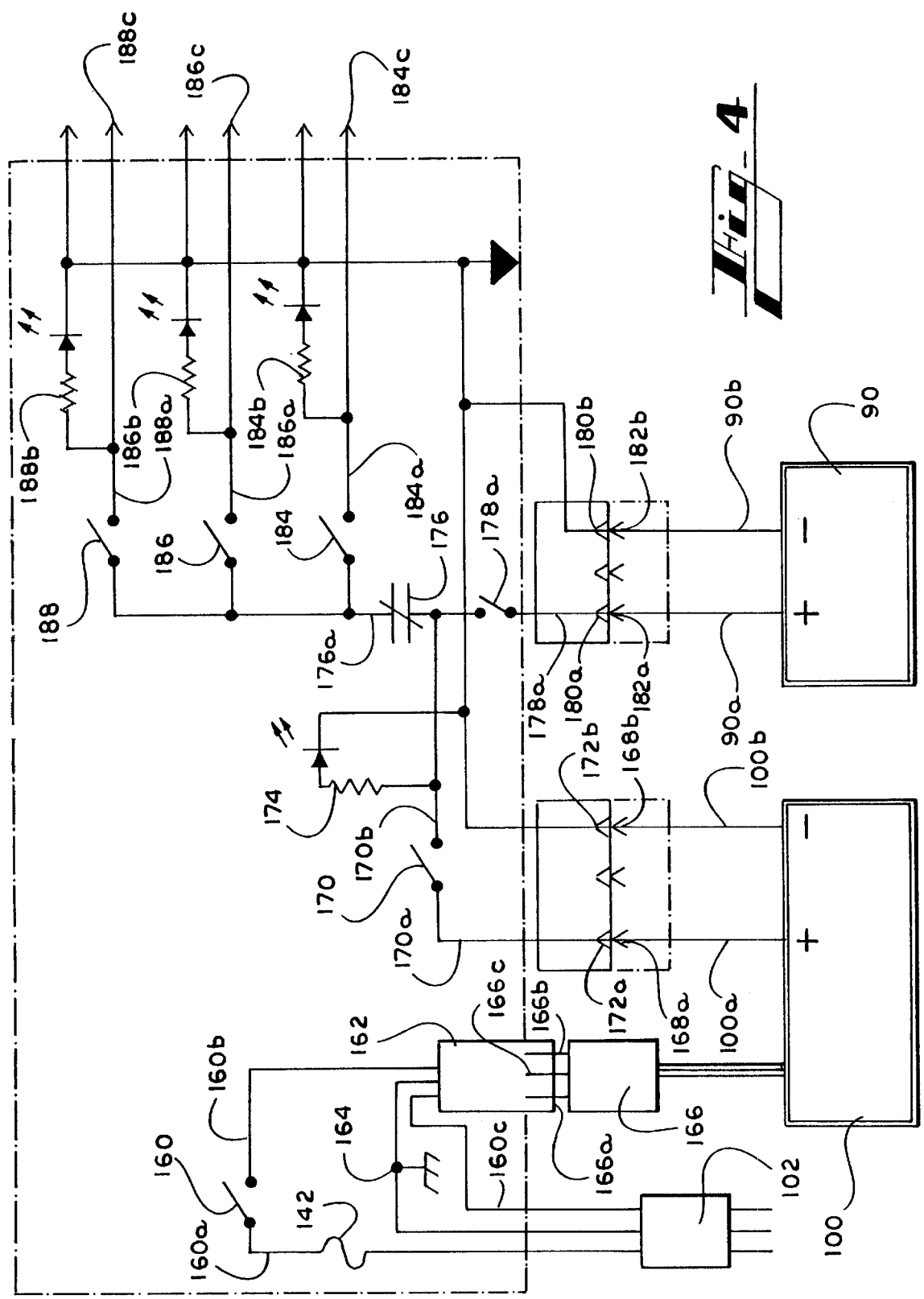
FIG. 4 is a schematic diagram of the control panel of FIG. 3.

The preferred schematics of control panel 140 are best seen in FIG. 4. AC/power control switch 158 is schematically represented by switch 160. A first terminal of switch 160 is electrically connected by conductor 160a through fuse 142 to an AC source at receptacle 102. A second terminal of switch 160 is electrically connected by conductor 160b to AC socket 162. Ground wire 164 and conductor 160c are connected between receptacle 102 and AC socket 162. AC plug 166 is electrically connected to AC socket 162 via conductors 166a and 166b and ground 166c.

AC plug 166 extends from battery charger 100, whereby AC power is received. Conductor 100a connects anodic terminal of battery charger 100 to connector plug 168a. Preferably, connector plug 168a has a three-pin configuration. Conductor 100b connects cathodic terminal of battery charger to connector plug 168b. Preferably, connector plug 168b has a three-pin configuration.

Battery charge control switch 152 is schematically represented by switch 170. A first terminal of switch 170 is electrically connected by conductor 170a to connector receptacle 172a. Preferably, connector receptacle 172a has a three-pin configuration, whereby connector plug 168a may be inserted therein. A second terminal of switch 170 is electrically connected by conductor 170b to resistor 174, thereby operating power indicator light 146, to switch 176, the schematic representation of emergency stop switch 158, to connector receptacle 180b and to switch 178. Preferably, resistor 174 is a 3 K, ½ W, 5% resistor.

Battery control switch 150 is schematically represented by switch 178. A first terminal of switch 178 is electrically connected by conductor 178a to connector receptacle 180a. Preferably, connector receptacles 180a and 180b have a three-pin configuration.

Conductor 90a connects anodic terminal of battery 90 to connector plug 182a. Preferably, connector plug 182a has a three-pin configuration, whereby connector receptacle 180a is inserted therein. Conductor 90b connects cathodic terminal of battery 90 to connector plug 182b. Preferably, connector plug 182b has a three-pin configuration, whereby connector receptacle 180b is inserted therein.

Pump control switches 154a, 154b and 154c are schematically represented by switches 184, 186 and 188, respectively. A first terminal of switches 184, 186 and 188 is electrically connected to switch 176 by conductor 176a. A second terminal of switches 184, 186 and 188 is electrically connected by respective conductors 184a, 186a and 188a to respective connector receptacles 184c, 186c and 188c. Preferably, connector receptacles 184c, 186c and 188c have a two-pin configuration. The second terminal of switches 184, 186 and 188 is also electrically connected by respective conductors 184a, 186a and 188a to respective resistors 184b, 186b and 188b, thereby operating respective pump indicator lights 148a, 148b and 148c. Preferably, resistors 184b, 186b and 188b are 3 K, ½ W, 5% resistor.

It will be recognized that control panel 140 could be configured without fuse indicator light 144, power indicator light 146 and/or pump indicator lights 148a, 148b and 148c therein.

It also will be recognized that portable cart housing could define a substantially cylindrical shape.

It will be further recognized that portable cart housing 20 could have three wheels, whereby increased maneuverability could be provided.

Additionally, it will be recognized that first ends 51a, 52a and 53a of reservoir containers 51, 52 and 53, respectively, could be positioned within portable cart housing 20, wherein removable caps 54a, 54b and 54c could extend through top wall 28 into respective reservoir containers 51, 52 and 53, threadedly seating therein.

It will be still further recognized that handles 56a, 56b and 56c of caps 54a, 54b and 54c could be integrally formed therein.

It will be yet further recognized that portable spray car wash device 10 could be solar powered.

It will be recognized also that second end 121b, 122b and 123b of hoses 121, 122 and 123 could have quick-connect adaptors provided thereon, enabling easy connection and removal of spray triggers 124, 125 and 126 thereto.

In use, lids 54a, 54b and 54c are removed from reservoir containers 51, 52 and 53. First container 51 is filled with a user-provided chemical solution for spraying onto the metal and/or fiberglass shell of an automobile, for rubbing into the shell and removing dirt, grime and grease therefrom. Second container 52 is filled with a user provided glass cleaning solution for spraying onto the windshield and windows of an automobile, for rubbing off and cleansing the windshield and windows. Third container 53 is filled with a user provided liquid wax for spraying onto the metal and/or fiberglass shell of an automobile, for rubbing into the metal and/or fiberglass for a polished shine.

Handles 36a, 36b, 36c, 37 and 38 are utilized to push, pull or otherwise maneuver portable spray car wash device 10 into position, proximate to a vehicle to be cleaned. Battery control switch 150 is positioned to permit a flow of power from battery 90 to motors 71, 72 and 73. Depending upon user preference and vehicle needs, a pump control switch 154a, 154b or 154c is selected. Pump control switch 154a is switched to the "On" position to engage motor 71, thereby accessing the liquid contents of reservoir container 51 for application via spray nozzle 124. Pump control switch 154b is switched to the "On" position to engage motor 72, thereby accessing the liquid contents of reservoir container 52 for application via spray nozzle 125. Pump control switch 154c is switched to the "On" position to engage motor 73, thereby accessing the liquid contents of reservoir container 53 for application via spray nozzle 126.

Depending upon which spray nozzle 124, 125 or 126 is being utilized, flow therefrom is user-controlled via respective knobs 156a, 156b or 156c.

If battery 90 loses power, a user-supplied power cord is inserted into AC power receptacle 102, and AC/charge control switch 152 is activated, thereby enabling recharging thereof.

Advantageously to the present invention, paper towels may be used to polish the vehicle surface following application of each chemical. Such paper products may, of course be recycled or disposed of in an environmentally sound manner. Rugs may be laundered to make them environmentally safe and clean. Waste materials collected by the laundering processes may be treated and stored away by the municipal or county governments, in some cases for a fee. Accordingly, the adverse environmental impact of the device of the present invention is minimized, along with the cleaning byproducts thereof.

In a first alternate-embodiment, shown in FIGS. 5 and 6, device 210 comprises a configuration wherein an air compressor mechanism is used to direct fluid distribution. Accordingly, horizontally mounted air tank 250 is connected to compressor motor 270 to provide positive air pressure to the system. Battery 290 and battery charger 200 are provided to power the system in the manner previously described. Shelf 256 is provided with stand-offs 257 integrally connected to the framework of device 210 in order to support chemical reservoirs 251, 252, 253. Each reservoir 251, 252, 253 is connected to fluid line 222 (only one shown for clarity). Air hose 223 is connected to air tank 250. Fluid lines 222 and air hose 223 are connected to sprayer 220 in order to deliver sufficient pressure to sprayer 220 to draw chemical fluid from reservoirs 251, 252, 253, respectively, and to effectuate delivery of the fluid through sprayer 220 onto a vehicle surface. Control panel 240 is provided in order to control motor activation, air pressure, and related functionality, in the manner previously described with regard to FIGS. 1–3.

In a second alternate embodiment, shown in FIG. 7, device 310 comprises a configuration wherein an air compressor mechanism is used to direct fluid distribution. Accordingly, horizontally mounted air tank 350 is connected to compressor motor 370 to provide positive air pressure to the system. Battery 390 and battery charger 300 are provided to power the system in the manner previously described. Bolt hole patterns 356 are provided in order to integrally connect to the framework of device 310 chemical reservoirs 351, 352 (not shown), 353 (not shown). Each reservoir 351, 352, 353 is connected to fluid line 322 (only one shown for clarity). Air hose 323 is connected to air tank 350. Fluid lines 322 and air hose 323 are connected to sprayer 320 in order to deliver sufficient pressure to sprayer 320 to draw chemical fluid from reservoirs 351, 352, 353, respectively, and to effectuate delivery of the fluid through sprayer 320 onto a vehicle surface.

Figure 8:
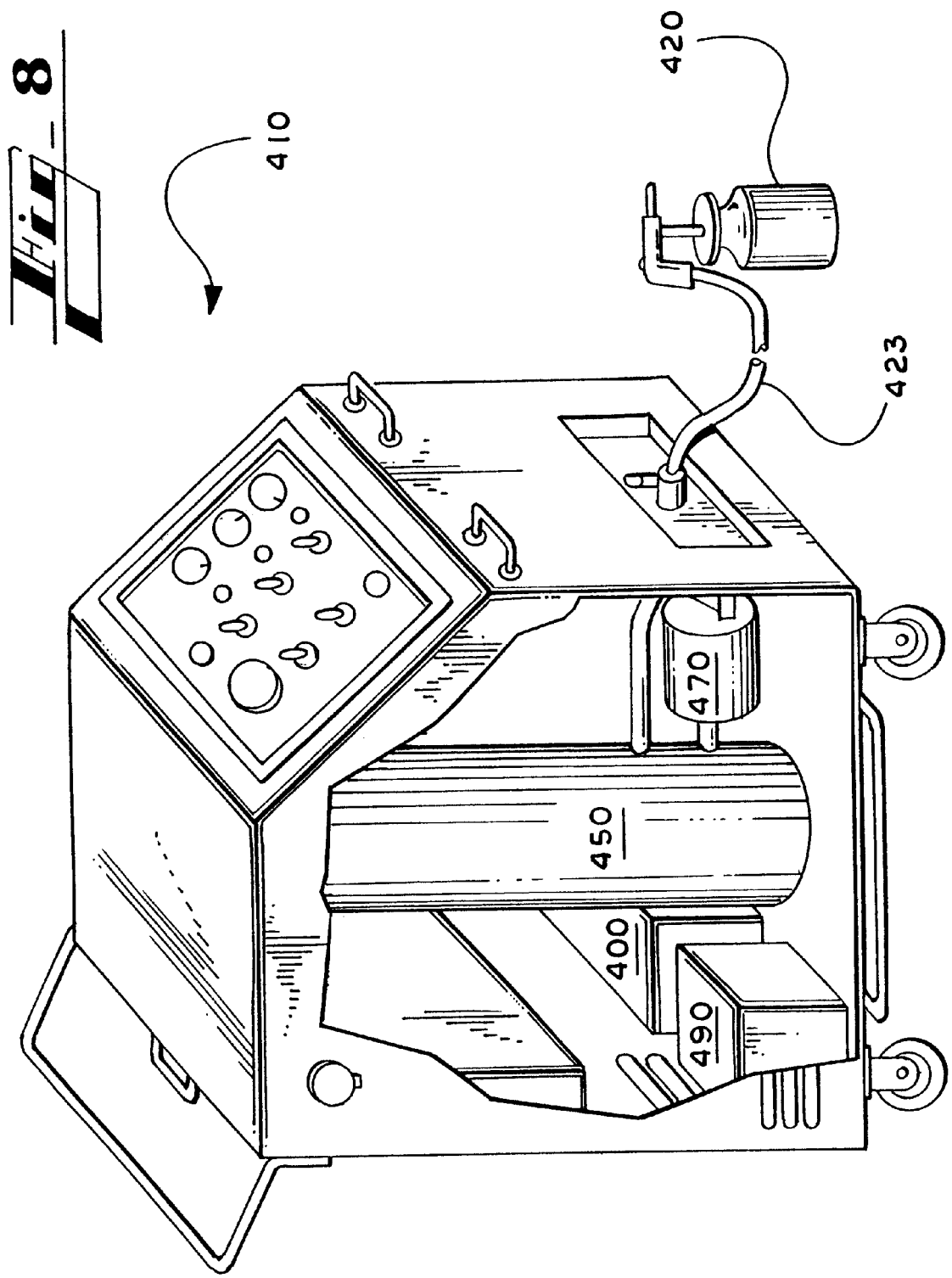
FIG. 8 is a perspective cutaway view of portable spray car wash device according to a third alternate embodiment of the present invention.

In a third alternate embodiment, shown in FIGS. 8–9, device 410 comprises a configuration wherein an air compressor mechanism is again used to direct fluid distribution. Accordingly, vertically mounted air tank 450 is connected to compressor motor 470 to provide positive air pressure to the system. Battery 490 and battery charger 400 are provided to power the system in the manner previously described. Air hose 423 is connected to air tank 450. Interchangeable, integral reservoir sprayers 420 (only one of three shown) are fluidly connected to the end of air hose 423 in a manner well-known in the art in order to provide chemical distribution to the vehicle surface.

Figure 10:
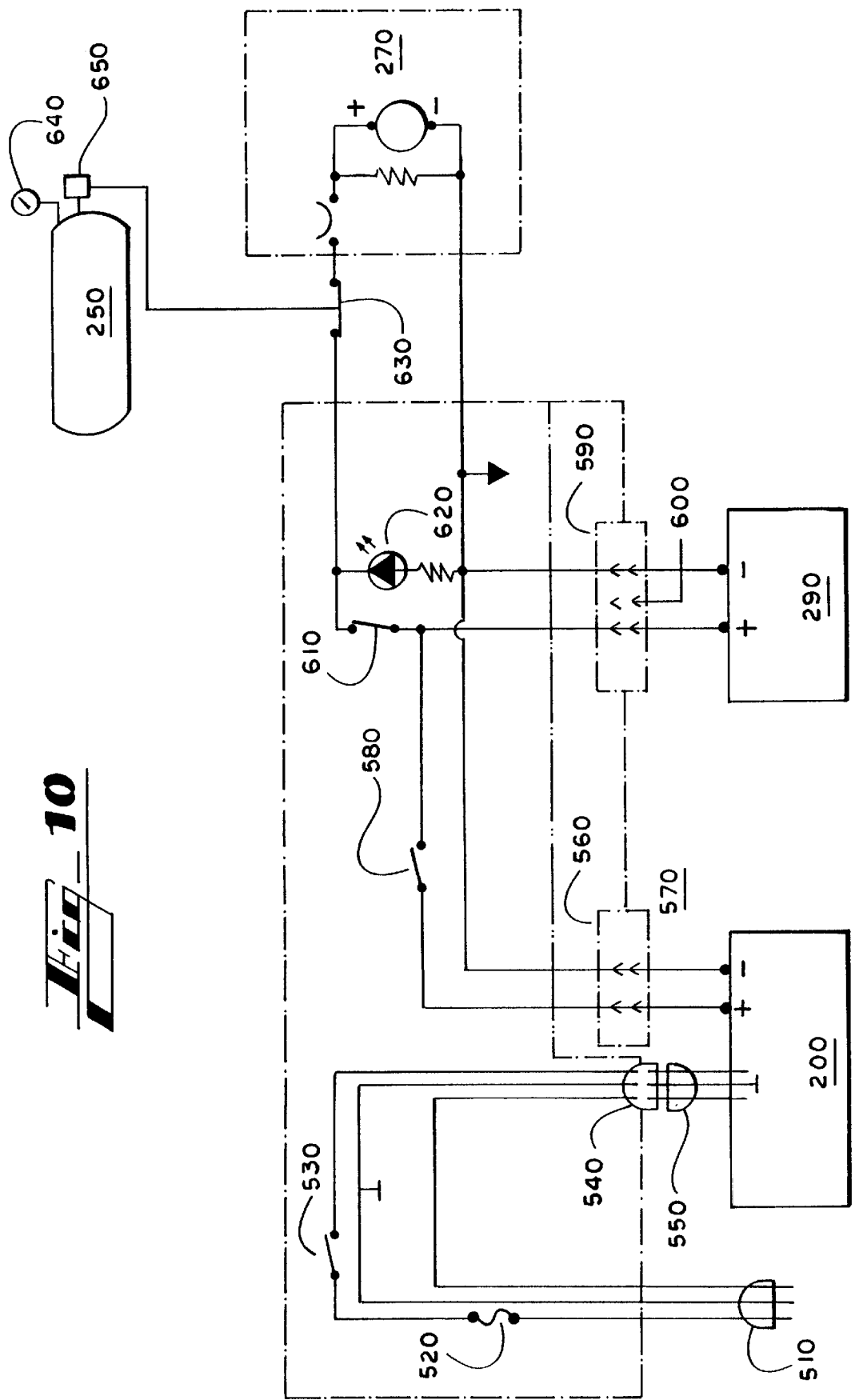

Referring next to FIG. 10, shown is a representative schematic diagram of the control system of the embodiments of the present invention shown in FIGS. 5–9. For the sake of clarity, mechanical component designations described with reference to FIG. 5 are utilized. Accordingly, AC plug 510 is connected through fuse 520, switch 530, ground, and sockets 540, 550 to battery charger 200. Battery charger 200 is connected through jack 560, 590, guide plugs 570, 600, and switch 580 to battery 290. This portion of the power system is connected through switch 610, power indicator 620, and pressure switch 630 to compressor motor 270. Pressure switch 630 is connected to air tank 250. Air tank 250 is connected to pressure gauge 640 and outlet pressure switch 650. Modifications of this diagram will be obvious to one ordinarily skilled in the art, and are within the contemplation and scope of the present invention.

Having thus described exemplary embodiments of the present invention, it should be noted by those skilled in the art that the within disclosures are exemplary only, and that various other alternatives, adaptations, and modifications may be made within the scope of the present invention. Accordingly, the present invention is not limited to the specific embodiments illustrated herein, but is limited only by the following claims.

What is claimed is:

1. A portable spray car wash device, comprising:

a cart having a plurality of wheels;

a housing, said housing carried by said cart and said housing having an outer surface, said outer surface having ventilation panels defined therethrough and at least one handle carried thereon;

a control panel, said control panel positioned on said outer surface of said housing;

at least three reservoir containers for liquids for rubbing into an exterior surface of a vehicle, each said container having a removable cap secured thereon;

at least one motor, said at least one motor for driving fluid through each of said reservoir containers;

at least one battery, said battery electrically connected to said motor;

means for recharging said battery;

at least one hose fluidly connected to each said reservoir container; and, three spray nozzles, each said spray nozzle connectable to said motor and to one of said reservoirs by said at least one hose.

2. The portable spray car wash device of claim 1, wherein said means for recharging said battery is a battery charger and an AC receptacle for conducting power thereto, wherein said AC receptacle is positioned on said outer surface of said housing.

3. The portable spray car wash device of claim 1, further comprising an AC power receptacle, said AC power receptacle carried by said housing.

4. The portable spray car wash device of claim 1, wherein said control panel further comprises a plurality of switches and controls.

5. The portable spray car wash device of claim 4, wherein said plurality of switches and controls comprises a fuse, a first switch enabling user activation and deactivation of said battery, a second switch enabling user activation and deactivation of said means for recharging said battery, at least one switch enabling user activation and deactivation of said motor, and at least one means of independently regulating flow from said motor.

6. The portable spray car wash device of claim 5, wherein said means of independently regulating flow from said motor is a knob.

7. The portable spray car wash device of claim 5, wherein said means of independently regulating flow from said motor is a lever.

8. The portable spray car wash device of claim 5, wherein said plurality of switches and controls further comprises a switch enabling user activation and deactivation of an emergency stop override.

9. The portable spray car wash device of claim 5, wherein said control panel further comprises a first indicator light, said light illuminating when power is flowing, a second indicator light, said light illuminating when a first motor is activated, a third indicator light, said light illuminating when a second motor is activated, a fourth indicator light, said light illuminating when a third motor is activated, and a fifth indicator light, said light illuminating when said fuse is defective.

10. The portable spray car wash device of claim 1, further comprising a toolbox, said toolbox carried within said housing and said toolbox accessible from said outer surface of said housing.

11. The portable spray car wash device of claim 1, wherein each said removable cap of each said reservoir container carries a handle pivotally thereon.

12. A portable spray car wash device, comprising:

a wheeled platform;

a housing, said housing carried by said platform and said housing having an outer surface, said outer surface having ventilation panels defined therethrough and at least one handle carried thereon;

a control panel, said control panel having a plurality of operational controls and indicators, and said control panel positioned on said outer surface of said housing;

three tanks for holding liquids for rubbing into an exterior surface of a vehicle, each said tank having a removable cap secured thereon;

three motors, each said motor connected to one said tank;

a battery, said battery electrically connected to said motors;

a battery charger;

an AC receptacle positioned on said outer surface of said housing, said AC receptacle receiving AC power and conducting said power to said battery charger;

three hoses; and three spray nozzles, each said spray nozzle connected to one said motor by one said hose.

13. The portable spray car wash device of claim 12, wherein said plurality of indicator controls and indicators comprises a fuse, a first switch enabling user activation and deactivation of said battery, a second switch enabling user activation and deactivation of said means for recharging said battery, at least three switches enabling user activation and deactivation of said motors, wherein each said switch for enabling user activation and deactivation of said motors independently controls one of said motors, and at least three means of independently regulating flow from each said motor.

14. The portable spray car wash device of claim 13, wherein each said means of independently regulating flow from each said motor is a knob.

15. The portable spray car wash device of claim 13, wherein each said means of independently regulating flow from each said motor is a lever.

16. The portable spray car wash device of claim 13, wherein said plurality of operational controls and indicators further comprises a switch enabling user activation and deactivation of an emergency stop override.

17. The portable spray car wash device of claim 13, wherein said control panel further comprises a first indicator light, said light illuminating when power is flowing, a second indicator light, said light illuminating when a first motor is activated, a third indicator light, said light illuminating when a second motor is activated, a fourth indicator light, said light illuminating when a third motor is activated, and a fifth indicator light, said light illuminating when said fuse is defective.

18. The portable spray car wash device of claim 12, further comprising a toolbox, said toolbox carried within said housing and said toolbox accessible from said outer surface of said housing.

19. A portable spray car wash device, comprising:

a cart having a plurality of wheels;

a housing, said housing carried by said cart and said housing having an outer surface, said outer surface having ventilation panels defined therethrough and at least one handle carried thereon;

at least three reservoir containers for liquids for rubbing into an exterior surface of a vehicle, each said container having a removable cap secured thereon;

at least three motors, each said motor connected to one said reservoir container;

at least one battery, said battery electrically connected to said motors;

a battery charger;

an AC receptacle positioned on said outer surface of said housing, said AC receptacle receiving AC power and conducting said power to said battery charger;

at least three hoses;

at least three spray nozzles, each said spray nozzle connected to one said motor by one said hose;

a control panel, said control panel positioned on said outer surface of said housing and said control panel having switches, controls and indicators comprising a fuse, a first switch enabling user activation and deactivation of said battery, a second switch enabling user activation and deactivation of said means for recharging said battery, at least three switches enabling user activation and deactivation of said motors, wherein each said switch for enabling user activation and deactivation of said motors independently controls one of said motors, at least three knobs, said knobs independently regulating flow from each said motor, a switch enabling user activation and deactivation of an emergency stop override, a first indicator light, said light illuminating when power is flowing, a second indicator light, said light illuminating when a first motor is activated, a third indicator light, said light illuminating when a second motor is activated, a fourth indicator light, said light illuminating when a third motor is activated, and a fifth indicator light, said light illuminating when said fuse is defective; and, a toolbox, said toolbox carried within said housing and said toolbox accessible from said outer surface of said housing.

* * * * *